United States Patent

[11] 3,569,952

[72] Inventor Hans R. Schindler
Syracuse, N.Y.
[21] Appl. No. 689,888
[22] Filed Dec. 12, 1967
[45] Patented Mar. 9, 1971
[73] Assignee General Electric Company

[54] TIME DIVISION MULTIPLEX SYSTEM AND A LOGARITHMIC ENCODER FOR HIGH SPEED MULTIPLEX OPERATION
4 Claims, 5 Drawing Figs.

[52] U.S. Cl. .......... 340/347
[51] Int. Cl. .......... H03k 13/16
[50] Field of Search .......... 340/347; 325/38; 179/15 (APC)

[56] References Cited
UNITED STATES PATENTS
3,056,085 9/1962 James et al. .......... 340/347X
3,351,931 11/1967 Lytle .......... 340/347

OTHER REFERENCES
Susskind, NOTES ON ANALOG-DIGITAL CONVERSION TECHNIQUES, John Wiley & Sons, Inc., 1957, pp. 5—10 through 5— 19.

*Primary Examiner*—Maynard R. Wilbur
*Assistant Examiner*—Michael K. Wolensky
*Attorneys*—Richard V. Lang, Marvin A. Goldenberg, Melvin M. Goldenberg, Frank L. Neuhauser and Oscar B. Waddell

ABSTRACT: A time division multiplex system and a logarithmic encoder for high speed multiplex operation is described. By means of a switching network, the system continuously samples a large number of amplitude information signals, typically voice signals, available on separate input channels and encodes them by a logarithmic law into a binary coded form. The coded groups are applied to a common output channel in the time division multiplex format.

The encoder is logarithmic, employing a tunnel diode threshold device for comparing the sampled input signal with a repetitive wave of internal generation having an exponentially decaying waveform.

A servo network is further provided for stabilizing the encoding tunnel diode against thermal variations and other factors.

INVENTOR:
HANS R. SCHINDLER,
BY Richard V. Lang
HIS ATTORNEY.

INVENTOR:
HANS R. SCHINDLER,
BY Richard V. Lang
HIS ATTORNEY.

INVENTOR:
HANS R. SCHINDLER,
BY Richard V. Lang
HIS ATTORNEY.

TIME DIVISION MULTIPLEX SYSTEM AND A LOGARITHMIC ENCODER FOR HIGH SPEED MULTIPLEX OPERATION

BACKGROUND OF THE INVENTION

1. Field of the Invention

The invention relates to the art of multiplexing a plurality of amplitude information input signals upon a single output channel of high bandwidth and to an encoder for use in a high speed multiplex system for encoding signal samples according to a logarithmic law and then converting the logarithmic values into binary form. The multiplex technique is of the time division variety, suitable for voice channels, and is appropriate for communication channels capable of handling pulses at a 50 million bit per second rate.

2. Description of the Prior Art

The needs of increased volumes of information flow have led to the development of microwave communication systems of high bandwidth. With the advent of radio, the narrower bandwidths of individual telephone lines were first surpassed. Telephone lines had customarily embraced only a small portion of the audible spectrum, typically the 100 to 3500 cycles found to be required for optimum intelligibility. Typical radio transmission techniques readily doubled and later quadrupled these bandwidths. With the advent of microwave communications, increased available bandwidths made it feasible to combine ever larger numbers of narrow bandwidth telephone signals into a single microwave channel. Television, the occasion for another increase, required microwave communication channels having bandwidths of from 3 to 5 million cycles. More recently, satellite communication systems have offered an additional 10-fold increase in bandwidth capabilities, making it possible to consider multiplex systems in terms of hundreds of telephone circuits.

With such increased bandwidth capabilities in modern communication systems and with liberal borrowings from other electronic advances, the art of multiplexing is undergoing substantial change. At an early stage, frequency division multiplex provided the answer to combining multiplex telephone channels on a microwave channel. The information from separate telephone lines was modulated on spaced high frequency carriers and after transmission the channels were separated by frequency selective filters. These techniques and their refinements have tended to become more cumbersome with increased bandwidths. At the same time, developments in digital transmission systems, e.g., telemetering, as well as developments in computer systems per se, have shown an alternate way for handling and converting large flows of parallel information into serial form. In these later systems, high speed capabilities have evolved for switching, for registering, for counting, for converting from analogue to digital form, and the reverse, and for other related operations. Many of these advances have been premised upon advances in semiconductor technology, particularly the tunnel diode, the field effect transistor, and major refinements in transistor design and diode design generally. In the present invention, these advances in data handling techniques, based in turn on underlying advances in semiconductor technology are applied to multiplex voice communications.

SUMMARY OF THE INVENTION

It is accordingly an object of the invention to provide a novel system for multiplexing a large plurality of voice signals upon a single high bandwidth channel in time division multiplex.

It is another object of the present invention to provide a novel system for multiplexing a plurality of amplitude modulation signals upon a common channel by use of a recurrent sampling technique in which successive samples are converted into digital form.

It is a further object of the invention to provide a novel encoder for multiplex operation capable of encoding a large number of amplitude information signals by a logarithmic law upon a single channel of high bandwidth.

It is another object of the invention to provide a novel logarithmic encoding element utilizing a tunnel diode as a comparator and exhibiting a high rate of speed in effecting a comparison.

It is still another object of the invention to provide a novel logarithmic encoding element utilizing a tunnel diode as a comparison device with improved immunity to drift.

These and other objects of the invention are accomplished by an arrangement employing a high speed switching matrix, typically of a tree configuration having two ranks of switches, arranged to make successive connections from each of a plurality of input signal lines to a single output line; an encoder for momentarily negative signals and an encoder for momentarily positive signals coupled to the switching matrix, the encoders being arranged to produce a digital signal indicative of the amplitude of the signal momentarily sampled; and a multiplexing network for combining the outputs of the two encoders and creating a composite signal for each sample wherein polarity information is contained in one bit of the digital signal.

In further accord with the present invention, the encoding element employs a tunnel diode as a comparison device in a circuit adapted to compare consecutively sampled input signals with a recurrently generated internal signal having an exponentially decaying waveform. By accurately timing this comparison process and by counting the time in numbers of short time intervals, the encoding law is made logarithmic. The logarithmic encoding function is achieved by use of an auxiliary oscillator of high frequency whose period is set equal to the desired time interval, a gate subject to the control of the tunnel diode encoding element for stopping the counting process when the comparison device indicates equality, and a binary counter of high speed capability for counting the discrete waves passed by the gate and thus the count of the time intervals corresponding to the logarithmic decrements preceeding equality. By taking a suitable complement of the count, the logarithm of the sampled signal amplitude above a minimum value appears in binary form at the output of a counter.

In accord with a further aspect of the invention, a servonetwork is provided for comparing the encoding of a zero or near zero amplitude signal in the comparison device against a signal accurately delayed by a delay line to obtain an error signal. This error signal is then used to compensate for drift of the tunnel diode comparison device by shifting its operating point to avoid the encoding error.

BRIEF DESCRIPTION OF THE DRAWING

The novel and distinctive features of this invention are set forth in the claims appended to the specification. The invention itself, however, together with the further objects and advantages thereof may best be understood by reference to the following description and accompanying drawings, in which:

DESCRIPTION OF THE PREFERRED EMBODIMENT

Figure 1:
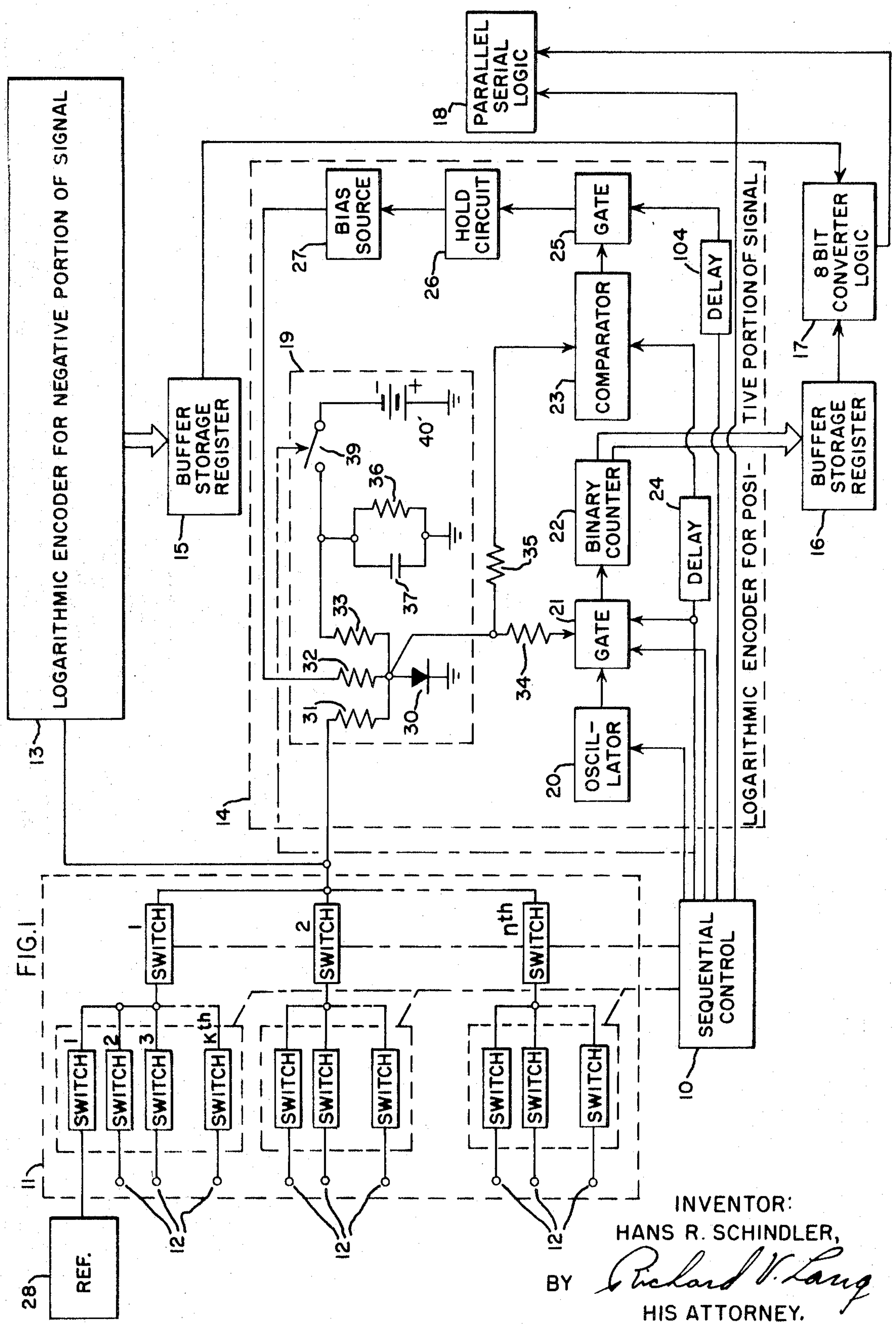
FIG. 1 is a block diagram of a high speed time division multiplex system in accordance with the invention.

Referring now to FIG. 1, there is shown in block diagram from a high speed pulse code modulation (PCM) encoding system in accordance with the invention. Its function is to "-multiplex" amplitude information signals from each of a large plurality of input lines onto a single output channel. In the particular form here disclosed, the output signal consists of successive samples of these input signals, sampled at an adequately high rate to retain the essential input amplitude information, and encoded by a logarithmic law into a succession of binary coded signals. In one form, the present system may be used to convert several hundred voice signals from telephone lines into a form suitable for transmission of a high bandwidth satellite transmission system. Typically, the amplitude of the voice signals may be quantized into some 128 logarithmic levels and represented by a succession of 7 binary coded pulses with an 8th pulse added to indicate instantaneous polarity.

The PCM encoding system illustrated in FIG. 1 comprises a switching matrix 11 adapted to be connected in a regular manner to each of a plurality of input signal sources coupled to the input terminals 12, a logarithmic encoder 13 provided for encoding input signals whose polarity during the sampling interval is momentarily negative and a logarithmic encoder 14 for input signals whose polarity during the sampling interval is momentarily positive. One of the logarithmic encoders 13 and 14 is designed to produce a binary output signal for each sampling interval. Buffer storage registers 15 and 16 are coupled respectively to the output of encoders 13 and 14. At each sampling interval, one storage register will receive a count from the associated encoder and register it. Since it is desired to encode the sign together with the amplitude information, the outputs from the buffer registers 15 and 16 are together applied to the 8-bit converter logic 17 which combines the sign information bit with the 7 bits of amplitude information and stores them in 8-bit parallel form. A parallel to serial logic element 18 is finally provided to produce the desired single train of serial output pulses. These may conveniently be clocked at a 25 to 50 megacycle rate.

The switching matrix 11, when the inputs exceed 20 or 30 in number, takes the form of a double rank "tree." The first rank of switches in the tree, each switch being coupled to an input terminal 12, is subdivided into groups of typically 10—20 switches. Each group of first rank switches in turn feeds a single switch in a second rank. Similarily each switch in the second rank is fed from a like group of first rank switches, and is itself one of a group of typically 10—20 switches, all of whose outputs are joined to the single output connection leading to encoders 13 and 14.

Figure 3:
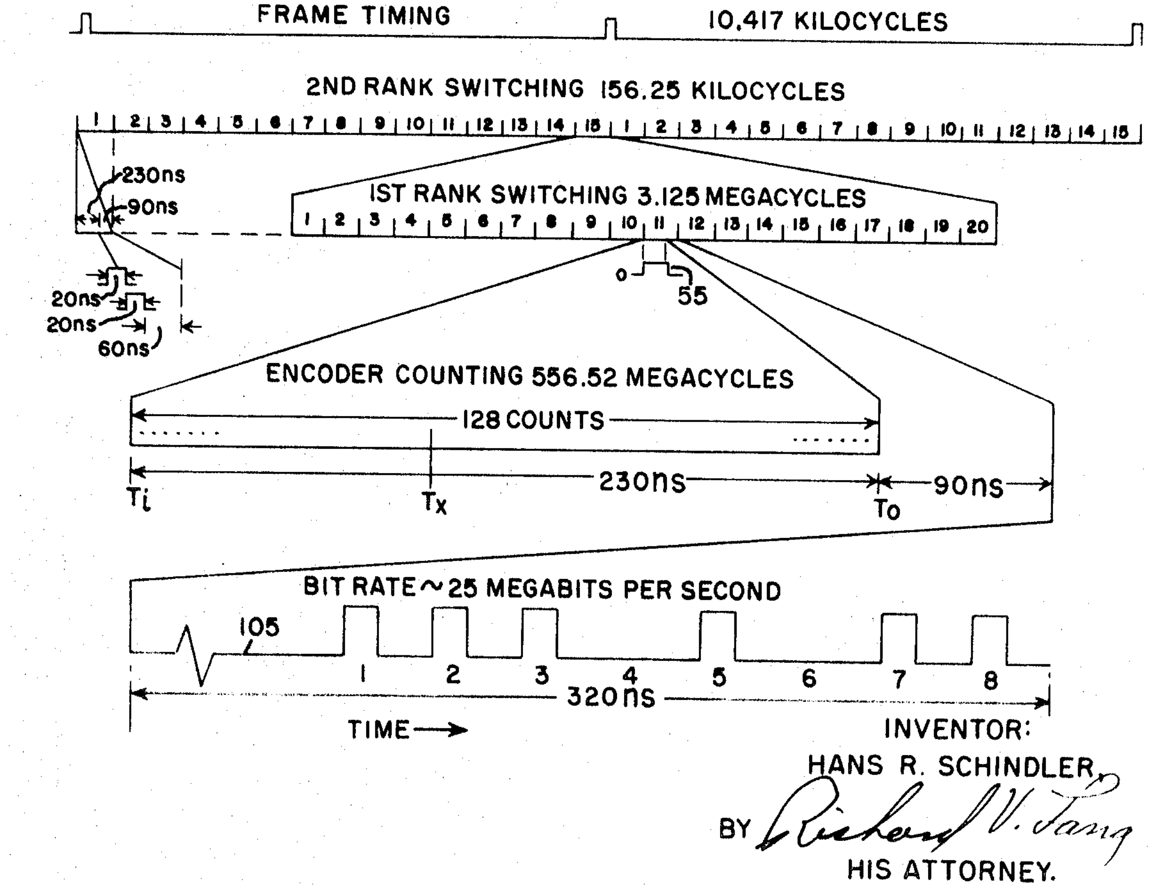
FIG. 3 is a timing diagram illustrating the sequence in which the various elements of the multiplex system are timed.

A sequential control 10 is provided for achieving sequential switching of the matrix 11 as well as for synchronizing the complete multiplexing system. Dash-dotted lines indicate schematically the control paths for achieving the desired matrix switching sequence. The timing diagrams are illustrated in FIG. 3. The sequential control 10 comprises means for timing the operation of a first switch in the first rank of the switching matrix to occur in synchronism with the operation of a first switch in the second rank, and for retaining the switch in the second rank in a conductive condition until all switches (1—k) in the first group of first rank switches have been successively make momentarily conductive. Then the second switch in the second rank is energized in synchronism with the first switch in the second group of first rank switches, and so forth, until all input terminals 1 to 100—400 (1 to k—n) have been sequentially coupled to the single output lead of the matrix 11.

Equipment for performing this sequential switching technique is well known. The function is equivalent to that of an electromechanical stepping switch. In high speed applications like the present, electronic switching is essential and the "fanout" limits are adjusted in accordance with the particular application. This limit is controlled by circuit tolerance to capacitive loading and the amount of cross talk that can be tolerated. Both are increased for each additional connection made to the common output point. Cascading ranks of switches into a "tree" configuration, with successive ranks so arranged that the number of switches applied to any common connection do not exceed a predetermined number is the usual technique to mitigate the loading problem. In the present application, a number between 10 and 20 is optimum, but will vary with application and the nature of the switching elements.

The individual switches may take several forms, including bipolar transistor switching circuits, diode bridges or field effect transistor circuit configurations. They should, as subsequently will appear, be capable of sequencing at a multimegacycle stepping rate for the indicated communications application herein described. Preferably they should be operated in a "break" "before" "make" mode to avoid cross talk and to aid in resetting the following logarithmic encoders, at the start of each new switching connection.

The output of the switching matrix 11 is coupled to encoders 13 and 14. The encoders in turn produce spaced sets of binary coded pulses, each set consisting of a 7 bit code, providing magnitude data for each of the successively sampled input signals. When encoder outputs are combined in element 17, an 8th bit provides polarity information. The sampling rate, as viewed at a given input terminal must be high enough to encode the significant amplitude information in the applied signal. In the case of 3.5 kc. bandwidth voice channels, this sampling rate is preferably of at least 7.0 kc. and for convenience is selected to be slightly over 10 kc. as illustrated in FIG. 3. To encode this quantity of information with fidelity places an extremely high speed requirement upon the encoder. The encoder for a 7 bit code is required to be capable of recognizing 128 different signal levels for the input signal in the available sampling time interval.

The positive sample encoder 14, which operates at this high speed, consists of the following principal elements; the logarithmic comparator 19, illustrated in simplified schematic form in FIG. 1, a binary conversion circuit comprising an oscillator 20, gate 21, and binary counter 22 coupled to the buffer storage register 16; and a stabilization network for the logarithmic comparator 19 comprising a comparator 23, a delay line 24, gate 25, hold circuit 26 and adjustable bias source 27. The elements 22 through 26, together with a reference source 28, shown connected to the first terminal of the switching matrix 11 complete the encoder stabilizing servonetwork.

The logarithmic comparator 19 is the heart of the encoder 14. It consists of a tunnel diode 30, having its cathode grounded and its anode jointly connected to one of the terminals of each of the five resistors 31, 32, 33, 34, and 35. A resistance capacitance network, consisting of a resistor 36 and capacitor 37 mutually shunted, has one terminal grounded and the ungrounded terminal connected to the remote terminal of resistor 33. A network for recurrently charging the RC network is schematically represented by a switch 39 connected to a negative polarity bias source 40, the bias source 40 also being grounded. The opening of switch 39 is timed from sequential control 10 to begin in synchronism with or slightly lagging the stepping of the switches in matrix 11. The slight lag in the operation of switch 39 is to permit any switching transient in the input lines to subside. The resistor 31 is serially connected between the tunnel diode anode and the output of switching matrix 11, and thus couples successively sampled input signals to the tunnel diode 30. The resistance 32 is serially connected between the anode of the tunnel diode 30 and the bias source 27. The source 27 supplies the operating bias current suitably compensated to avoid drift in the logarithmic encoding process.

Figure 2B:
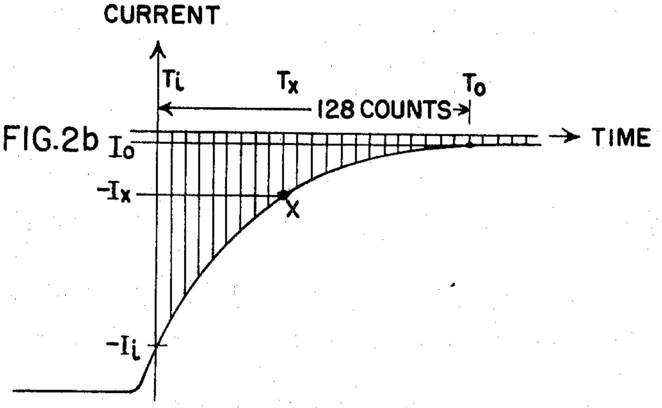
FIG. 2A is a waveform illustrating the switching characteristic of a tunnel diode employed in the logarithmic encoder and FIG. 2B is a waveform of an internally generated wave having an exponential characteristic used in the logarithmic encoding process.
Figure 2A:
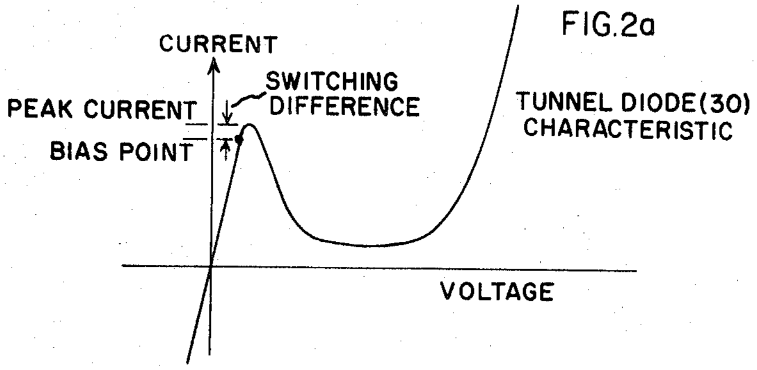

The circuit of 19 senses equality. The resistance 32 and the bias supply 27 are arranged to operate the tunnel diode 30 at a current level very close to the switching threshold, i.e, the peak current of the tunnel diode. This operating point selection is illustrated in FIG. 2A. With this setting an arbitrarily small increase in positive applied current will have the effect of switching the tunnel diode to its high voltage state. This change in state produces a sharp output transient. If two signals are applied to the tunnel diode of opposed polarity, the tunnel diode will operate when the positive signal exceeds the negative signal by this arbitrarily small increment. Thus the circuit compares the two input quantities and creates a transient at the instant that they become equal.

One input quantity is derived internally by element 19. The source 40, upon closing of the sampling switch 39, is arranged to charge the RC network 36—37 rapidly to a predetermined negative potential. The closing of switch 39 and resultant charging are timed by sequential control 10 to provide a full return of the RC network to reference potential at the start of each counting cycle. This potential is of a polarity to shift the instantaneous current flowing in the tunnel diode 30 to a more negative level. It has a magnitude selected to shift the instantaneous tunnel diode current beneath the switching threshold by a fixed amount, usually set to exceed the maximum contemplated signal current. When the switch 39 is opened, the potential across the RC network 36—37 commences to decay toward zero in the well-known exponential fashion, as illustrated in FIG. 2B.

The potential across the RC network 36—37 thus provides the quantity against which the input signal is compared. Its initial amplitude, the moment that decay begins and the rate of decay are critical parameters in accurately establishing this reference. The rate of decay is set sufficiently high so that for each switch setting of the network 11 the RC network can complete a full cycle of decay and reset. It is also desirable that the input signal quantity not vary during the comparison interval. In case of band limited voice signals and a number of input channels in the range of 100 to 300, the voice level can change only so little, that separate storing and holding circuits at the output of the switching matrix 11 are not necessary.

The input signal is obtained from a switching matrix 11 and coupled to the tunnel diode 30 through resistor 31. Since the potential from the RC network 36, 37 tends to shift current flow in the tunnel diode 30 to more negative levels, and since the source 40 is connected to the RC network at the instant of channel change, it is insured that the tunnel diode be reset to its low voltage condition. Resetting is further facilitated by creating a hiatus between the "break" and the new "make" of the matrix 11.

Since only the positive signals are effective to elevate the current in the tunnel diode toward the switching point and cause it to switch, the signals of momentarily negative polarity are ignored by the configuration in FIG. 1, block 14. The negative signal encoder 13 employs a tunnel diode in an inverted configuration and it performs the encoding function for momentarily negative signals.

Comparing the signal input quantity to the time variant exponential discharge makes the comparison a function of time and permits one to obtain the inverse, logarithmic function. As illustrated in FIG. 2B the reference quantity exhibits the well-known exponential decay characteristic of RC networks, commencing from an initially large negative value and ultimately approaching zero with the lapse of time. If this decay characteristic is divided into equal time intervals, it is seen that during the initial intervals when the comparison quantity is the largest in magnitude, the largest decrements occur; whereas when the decay characteristic approaches zero, decrements in amplitude for the same time intervals are relatively small. To a very close approximation, a suitable count of the number of equal intervals from a terminal calibrating point $T_o$ on the decay period backward to any arbitrary point $T_x$ on the curve, produces a quantity which is a simple logarithmic function on the input signal amplitude above that point. The terminal calibrating point can be the last or 128th count, which will be set at the least significant amplitude that is desired to be encoded. The first count would represent the largest amplitude to be encoded. Where 128 levels are indicated, the count can readily be obtained by counting forward in time from the moment that the decay commences until equivalence is signaled and then obtaining the 128 complement of the count.

The virtues of logarithmically encoding sensible phenomena are well known. The eye as well as photographic film tend to discriminate as a logarithmic function of light intensity. This is also true for audible phenomena. In accord with this same principle, the convention for sound measurement uses the decibel as a unit of measurement of sound intensity and is marked off upon a logarithmic scale. It is therefore preferable in a communications system, where efficiency in bandwidth utilization is a primary concern, that these classes of information be transmitted in a logarithmic rather than a linear form. A second very important advantage of logarithmic encoding is that the ratio of the quantization noise-to-audio signal amplitude is a constant over a wide dynamic range of audio levels.

Since the conversion of the sound signal into a logarithmic quantity is made a function of a time dependent phenomenon, accuracy in time measurement is essential. The comparator selected must be fast acting in signaling equality between the input signal and the reference quantity and this speed must be commensurate with the time intervals between successive quantized levels. In addition, means must be established for accurately determining these time intervals. The tunnel diode is a suitable comparison device and can be switched at a speed of approximately 0.1 nano second. The remainder of appliant's circuit, the oscillator 20, the gate 21, binary counter 22, and buffer storage 16 provide a means for accurately establishing the intervals ad for measuring and reading out the time signals from the tunnel diode in digital form. As indicated earlier, applicant's technique for measurement of the time intervals is dependent upon operating the oscillator 20 at a high rate of speed, typically at over 500 megacycles, a value which is set to coincide with the desired measurement increments. The output of the oscillator 20 is coupled through the gate 21 to a binary counter 22. The gate 21 is also of comparably high speed and is synchronized by control 10 as generally illustrated in FIG. 1. It is provided with two control inputs. A first input to sequential control 10 is for turning the gate on at the start of each counting interval. A second control input, coupled through the resistor 34 to the tunnel diode anode 30 is for turning the gate off under the influence of an output pulse from a tunnel diode at the moment that equivalence is sensed.

The oscillator 20, which is kept running at all times in synchronism with the sequential control 10, supplies oscillations to the binary counter 22 only during the intervals that the gate 21 is conductive. When the oscillator 20 is properly set to provide one cycle for each desired quantization level, the count on the binary counter will represent the number of decrements from maximum to the moment that equality is detected by the tunnel diode 30. The counter 22 coupled to the output of gate 21 is selected to be of sufficiently high speed to accommodate this rate of count. Ordinarily this requires that ultrahigh-frequency counting techniques be employed. The counter 22 is in other respects conventional and registers in binary fashion either the count directly obtained or the 128 complement of the count. The count (or its complement) is continuously stored in the counter 22 in its parallel output stages from the moment that the gate 21 is closed until the next count begins. When counting in each counting interval has ended, the information is transferred to counter buffer storage element 16. The stages 16 and 17 are of lower speed capability, requiring a 25 to 50 million bit per second speed capability. Buffer storage 16 comprises a succession of parallel storage switches, one for each bit, and a suitable register. The 8-bit converter logic 17, in its simplest form, may be comprised of 8 parallel OR gates. The 7 bit buffer storage register elements 15 and 16 are coupled in parallel to the 7 magnitude indicating OR gates. The polarity information is obtained from an 8th OR gate connected to sense a signal on any of the output register terminals of the element 16. Parallel to serial conversion in the output element 18 is of conventional design and synchronized by sequential control 10 to transmit groups at the 3-plug megacycle rate at which the first rank of switches are operated. The output pulses will thus appear at an average rate of approximately 25 million bits per second as generally illustrated in FIG. 3.

Figure 4:
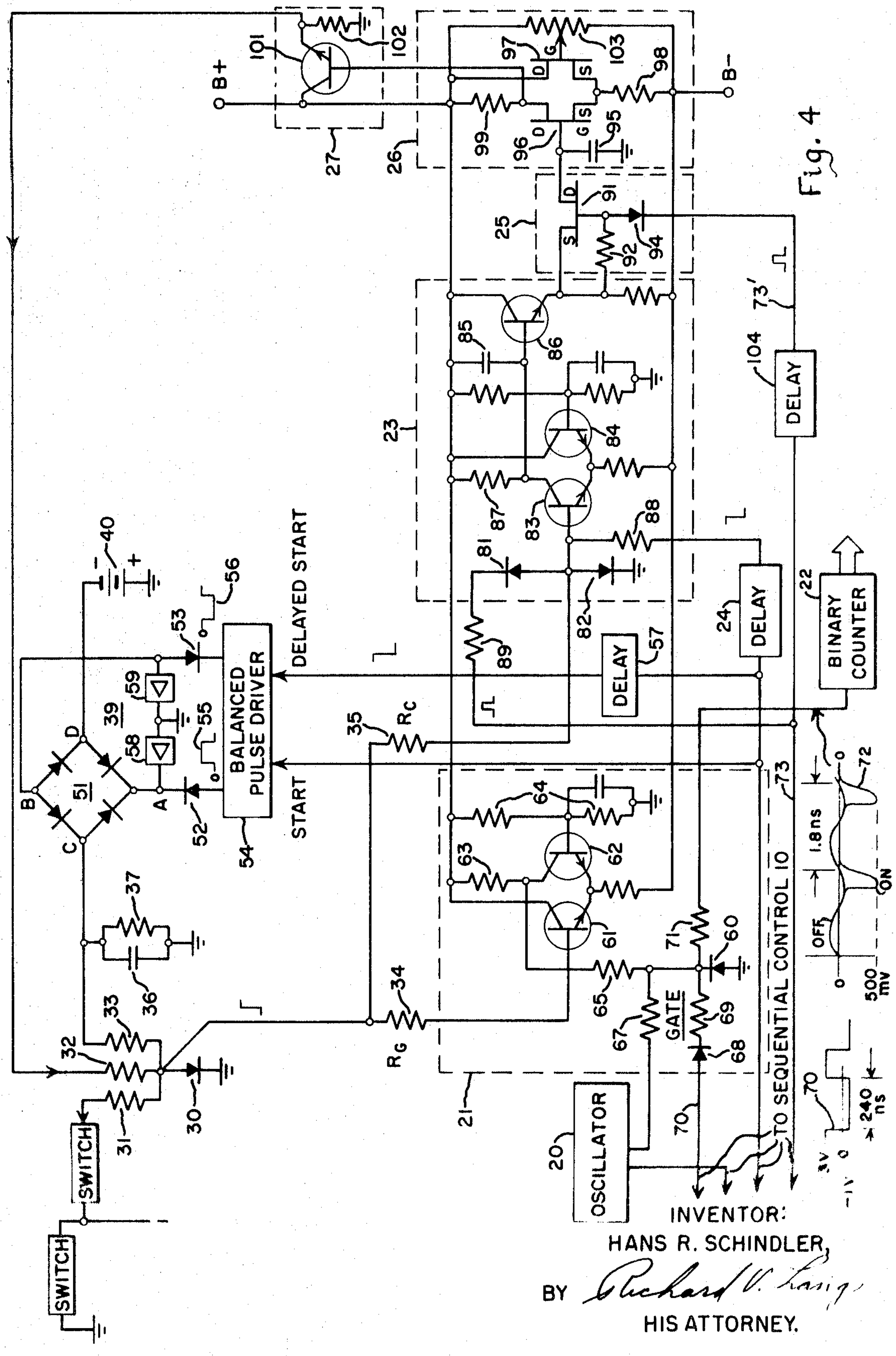
FIG. 4 is a circuit diagram illustrating in greater circuit detail the multiplex system of FIG. 1.

The circuitry for the comparator 19 is more precisely illustrated in FIG. 4. The figure illustrates the tunnel diode 30, resistors 31, 32, 33, 34 and 35, RC network 36, 37, and source 40 as before, but provides more particular detail as to the switch illustrated as the element 39 in FIG. 1. In particular, the switch 39 comprises a switching diode bridge 51 of typical high speed silicon or hot carrier diodes, poled as illustrated. The switching terminals of the bridge C, D are coupled respectively to the ungrounded terminal of RC network 36, 37 and to the negative terminal of source 40. The control terminals A, B of the bridge are coupled respectively through coupling diodes 52, 53, mutually reversely poled, to the balanced pulse driver 54. The constant current sources 58 and 59 are respectively coupled between the bridge control terminal A and ground, and terminal B and ground, and are of a polarity to induce forward conduction of the bridge diodes.

The balanced pulse driver 54 is arranged to provide two simultaneous pulse signals of equal magnitude and opposed polarity as illustrated at 55 and 56 respectively. These pulses commence at or momentarily after the matrix 11 is switched to a new position under sequential control 10 and are of appropriate magnitude to override constant current sources 58 and 59 and thus prevent conduction through the bridge. The duration of these pulses is set by a time delay element 57 which may take the form of a simple delay line to which the starting pulse is applied. The terminal moment of these pulses is selected to slightly exceed the counting interval while allowing the RC network time to be recharged to full potential in time for the next switching interval. Typically, this excess is 10 nano seconds. In an exemplary arrangement, with a total switching interval of approximately 320 nano seconds, 230 nano seconds provide the counting interval (with the bridge switch 39 being nonconductive) and 80 nano seconds provide the time for recharging the RC network (with the bridge switch 39 being conductive). As will be subsequently explained, the moment (that discharge of the RC network commences as a result of the opening of the bridge rectifier 39) may still precede by a few nano seconds the moment at which the counting mechanism 21, 22 begins the actual count. This delay is for the purpose of transient elimination, and ordinarily requires that the starting voltage at 40 be compensably in excess of the value at which the count is begun.

The bridge diode switch 39 operates in the well known manner as follows: constant current sources 58 and 59, unless overridden by the pulse driver 54 make the diode switch conductive. When bridge conduction does occur, equalizing current flows through the bridge from the RC network through a path including the diode between points C and A, through sources 58 and 59, and thence through the diode between points B and D to the negative terminal of the battery 40. During this period, the capacitor 36 is charged in a constant current mode. When the voltage difference between points B and C as well as A and D become comparable to the voltage drop of the silicon diodes, the charging process for the capacitor 36 changes to an RC mode. Since the charging time constant given by the product of the hold capacitor value and the "on" resistance of the diode bridge is a small fraction of the approximately 90 nano second time interval available for charging capacitor 36, the latter will be charged very accurately to the supply voltage of source 40. The equalizing action is terminated when the constant current source is overridden by the commencement of pulses 55 and 56 generated by the balanced pulse driver 54 for the succeeding interval.

The circuit for determining the tunnel diode switching instant is shown in greater detail in FIG. 4. It employs a second tunnel diode 60 in a gating configuration continuously supplied by the pumping oscillator 20, and gated on and off in response to bias levels jointly established by a differential amplifier and a pulse signal 70 derived from the sequential control 10 in an AND type logic.

The output of the comparison diode 30 is direct coupled through output load resistor 34 to the base of the first of a pair of transistors 61, 62. These transistors are connected in differential amplifier configuration having their emitters tied together and led through a common emitter resistance to a source of negative potentials. The collector of the first transistor 61 is directly led to a source of positive bias potentials while the collector of the second transistor 62 is led to the bias source through a load resistance 63. The potential of the base of the transistor 62 is adjusted by a voltage dividing network 64 so that it assumes a value intermediate the two DC voltage levels applied by the tunnel diode 30 to the base of transistor 61. This base voltage setting is typically 300 millivolts. The characteristic action of the differential amplifier 61, 62 is that its output collector potential will switch sharply from one value to another as the input signal at the first base (transistor 61) passes through the reference value set at the second base (transistor 62). In the present circuit, the output voltage of the differential amplifier may assume a lower value of approximately 1 volt positive and a higher value of approximately 4 volts positive. This change in bias is then used to switch the tunnel diode 60 from the active mode to the passive state.

The active element of the gate 21 is the tunnel diode 60 illustrated with its anode grounded and its cathode coupled through a resistance 65 to the output collector of the differential amplifier 61, 62. Also coupled to the cathode of the tunnel diode 60 is the oscillator 20, which is coupled thereto through a resistor 67. The oscillator 20 typically operates in excess of 500 megacycles and serves as the pump for the tunnel diode 60. As indicated by the control line to sequential control 10, the oscillator 20 is operated in synchronism with the switching matrix 11. In addition to its AC component, the oscillator 20 is referenced to a negative DC potential and is arranged to provide adequate negative current flows for pumping the tunnel diode 60.

The opening of the gate 21 is controlled from the sequential control 10 by the application of a pulse 70 to tunnel diode 60. The pulse 70 is applied through the diode 68 and resistance 69, both serially connected to the cathode of the tunnel diode 60. The pulse waveform of 70 starts from a normal positive potential of 3 or 4 volts and exhibits a sharp negative going transient to a potential in the vicinity of −1 volt. It holds this negative value throughout the counting interval, typically 240—250 nano seconds. Prior to making the gate 21 conductive, the positive potential coupled from the synchronizing control 10 holds the tunnel diode 60 off by its reverse biasing effect, even though the differential amplifier 61, 62 is in a low voltage state favoring operation. Upon the occurrence of the pulse 70, the high positive inverse bias on the tunnel diode 60 is removed, transforming the tunnel diode 60 from a passive to an active device and initiating a succession of high current pulses as shown at 72 across its terminals in synchronism with the oscillator 20.

The flow of high frequency pulses, initiated by negative pulse 70, continue through the gate 21 and are applied to the binary counter 22. They continue to flow until the comparison diode 30 is switched on. At that moment, the potential at the differential amplifier 61, 62 output goes to its upper positive value. Thereupon, a high inverse voltage is applied across the tunnel diode 60 returning it to its passive condition, and effectively turning it off. The diode 68 in the sequential control line is now poled reversely, thus effectively disconnecting that line. The negative pulse 70 continues until the period set for the maximum count expires and then returns to its normal positive value, holding the tunnel diode 60 in a passive condition until the onset of the next counting interval.

Upon completing a full counting cycle, the succeeding count is initiated as the comparison diode 30 is reset to its low voltage condition before the start of the next count. This sets the differential amplifier 61, 62 back to its low voltage position permitting, but not causing, the tunnel diode 60 to become active. With a new pulse 70 from sequential control 10, the inhibiting positive voltage on that line is also removed, permitting the tunnel diode 60 to become active. With both of these input values favorable, the tunnel diode 60 goes into an active mode, the gate 21 is made conductive again, and oscillations pass through it to the binary counter 22. Synchronism of the oscillator 20 with the switching matrix 11, permits an integral number of pulses to be applied to the binary counter 22. By the foregoing provisions, an extremely fast-acting circuit is provided for controllably gating a succession of pulses at a 500 megacycle rate into the counter 22.

The counter 22 coupled to the tunnel diode 60 must be adequately fast to count the pulses that are provided at the 500 megacycle rate. It should also have a threshold which discriminates between the smaller AC component that appears across the tunnel diode 60 when it is in a passive condition. Since the passive AC component may be a factor of 10 less than the active output of the tunnel diode, the threshold setting is relatively noncritical. The counter 22 then pushes provides a 7 bit conversion of the total count of pulses passed through the gate 21 and applied to the counter.

The encoder stabilizing servonetwork comprising blocks 23 through 27 is shown in schematic circuit detail in FIG. 4. In FIG. 4, dotted outlines 23, 25, 26 and 27 enclose the circuit provisions performing the functions attributable to the blocks in FIG. 1 which are correspondingly numbered. The servonetwork performs the function of stabilizing the logarithmic comparator 19 principally against drift due to changes in operating temperature and aging of the tunnel diode 30. Both of these conditions affect the peak current of the tunnel diode.

The accuracy of the encoding process depends substantially upon the preservation of an arbitrary but constant difference between the peak current and the bias point of the tunnel diode in the absence of a signal current from the switching matrix 11 or current from the RC network 36, 37.

This function is achieved by checking the conversion of a zero (or near zero) potential signal against a time reference corresponding to the last significant or zero count in the RC network. Since the encoder marks this last significant count by a pulse at the time at which it occurs, it is evident that one can measure the encoding error by the time difference between the marking pulse and the reference time. A time reference of substantial stability can be provided by a delay line element, which delays the initial pulse (that starts each count) by the requisite amount. Thus the problem of error sending becomes one of measuring the interval between two pulses.

This technique is carried out by use of a calibrating voltage, typically zero, from reference 28 applied to one of the input taps 12 of the switching matrix 11 and by use of the temperature stable delay line 24, which produces the delayed pulse, delayed an amount corresponding to the calibrating voltage, and the servonetwork 23—28 which is arranged to readjust the bias point of the tunnel diode 30 at least once in every switching sequence i.e., at the calibrating interval to the correct current difference below the peak point.

The gated comparator 23 develops an output voltage at the calibrating interval in the switching sequence which is a measure of the peak point drift in the encoder 19.

The gated comparator 23 has as its principal components a gate comprising the diodes 81, 82 to which the two signals used for calibration and a time gating signal are applied; a difference amplifier comprising the transistors 83, 84 which is switched on when the gate 81, 82 is on and off when the gate is off; a storage capacitor 85 adapted to be charged to a potential during periods when the differential amplifier is conducting approximately proportional to the conduction period; and finally an emitter follower connected transistor 86 for sensing the output potential on the storage capacitor 85 without adversely loading it.

The input gate comprising diodes 81, 82 has its anodes coupled to the base of the first transistor 83 of the difference amplifier. Diode 82 is a tunnel diode having its cathode grounded. It is adapted to switch from low voltage to a high voltage state, which change in potential is adequate and of a polarity to switch the transistor 83 from off and on. The anode of the encoding diode 30 is connected through resistance 35 to the base of transistor 83 for coupling switching pulses thereto. These pulses which are positive going are of a polarity tending to turn the tunnel diode 82 on.

The second signal, delayed a calibrated amount, is applied to the gated comparator 23 from the delay element 24 through resistance 88. The pulse applied to the delay element 24 is a negative transient coincident with the starting pulse 70 used to initiate the counts in the gate 21. It is delayed an amount slightly greater than the counting interval (129 —130 counts) to facilitate a unidirectional correction in the servoloop. This delayed pulse should have a polarity and be of appropriate magnitude to tend to turn off the tunnel diode 82 and thereby switch the differential amplifier 83, 84.

The diode 81 has its cathode coupled through resistance 89 to sequential control 10. By this connection a negative potential is maintained on the cathode of the diode 81 clamping the base of the transistor 83 to ground potential and preventing the tunnel diode 82 from switching to its high voltage state. However, once in each matrix switching sequence a positive going channel selection pulse 73 appears on this control line timed to unclamp the gate 81, 82 during the interval that the switching matrix is at the calibrating position. The channel selection pulse 73 should last through the latter portion of the calibrating interval and have a momentary positive potential appropriate for unclamping the gate 81, 82. The period may be from 220 nano seconds to 240 nano seconds, both measured from the start of the calibrating interval. During the channel selection pulse therefore, the tunnel diode 82 may now be turned on with the occurrence of a pulse from the encoding diode 30 and off with the occurrence of the delayed starting pulse from the delay line 24.

During the interval between these two pulses, the state of the difference amplifier 83, 84 is changed, making the transistor 83 conductive. This initiates a current flow, changing the capacitor 85 connected to the collector of transistor 83. The charge stored in the capacitor 85 is approximately proportional to the charging interval. The time constant of the associated circuit is short so that the capacitor is discharged during periods that transistor 83 is nonconductive. The amount of the charge is sensed by the emitter follower transistor 86 whose base is coupled to the terminal of the storage capacitor 85 remote from the bias potential. The emitter of the emitter follower transistor 86 is then connected to the gate 25.

The gate 25 passes the incremental charge on capacitor 85 on to the hold circuit 26. The gate 25 comprises a field effect transistor 91 having its gate coupled through a resistance 92 to its source and the source is connected to the emitter of transistor 86. The drain of the field effect transistor 91 is connected to the old circuit 26. A diode 94 is provided having its anode coupled to the gate of the field effect transistor 91 and its cathode coupled through a delay element 104 to the sequential control 10 for application of a conduction inducing channel selection pulse 73. By this connection, the gate 25 is turned on during a later position of the calibrating interval, and an electrical charge proportional to the charge on the capacitor 85 is coupled from the emitter follower 86 to the hold circuit 26.

The hold circuit 26 includes a storage capacitor 95 having one terminal grounded and the other coupled to the drain of the field effect transistor 91. Also included in the hold circuit 26 is a difference amplifier comprising paired field effect transistors 96, 97, the former having its gate coupled to the ungrounded terminal of the storage capacitor 95. The source of 96 is connected to a source of negative potentials through a resistance 98 and its drain is connected through a load resistor 99 to a source of positive bias potentials. The field effect transistor 97 has its source connected to the source of the field effect transistor 96 and its drain connected to a source of positive bias potentials. The gate of the field effect transistor 97 is connected to a potentiometer 103, the latter shunted between sources of negative and positive bias potential. The hold circuit 26 has a time constant, limited by the leakage resistances of the field effect transistors 91 and 96. The time constant should be substantially longer than the interval between channel selection pulses so as to effectively hold the small increments of charge from capacitor 85 introduced at an approximately 10 kilocycle rate by the error sensing circuit. Typically, the time constant of capacitor 95 should be on the order of a minute. The drain of the field effect transistor 97 is connected to the bias source 27. The differential amplifier 96, 97 is a linearly operated amplifier having a high input impedance.

The bias source 27 comprises a transistor 101 having its emitter grounded a load resistance 102. Its collector is directly coupled to a source of positive bias potentials. The emitter is also led to the terminal of resistor 32 remote from encoding diode 30. By this connection, the bias source 27 provides an adjustable bias current to the tunnel diode 30, adjusted to stabilize the encoding process.

The operation of the servoloop may be explained as follows: In each calibrating interval, the instant the tunnel diode 30 triggers is compared to the instant the delayed trigger pulse arrives at tunnel diode 82. The purpose of the servoloop is to maintain the time interval between the two instants constant and equal to a chosen value. For a fixed time interval, a fixed voltage across capacitor 85 and also across capacitor 95 is obtained. This value determines the bias for tunnel diode 30 through the operation of the amplifier 96, 97 and bias source 27.

In case the peak current of tunnel diode 30 drifts to a lower value (due to thermal effects etc.,) the tunnel diode 30 will trigger earlier in time and thus tunnel diode 82 will generate a wider pulse. As a consequence capacitor 85 is charged to a more negative value. Upon application of the gating pulse 73' through diode 94 to transistor 91, the capacitor 95 is discharged in part. The discharge for any one pulse duration is incomplete, however, since the duration of pulse 73' is made short in relation to the time constant established by the "on resistance" of transistor 91 and hold capacitor 95. The hold capacitor 95 thus assumes a new value and generates a reduced bias for the tunnel diode 30. In one calibrating interval, the effect of the tunnel diode peak current drift is partially corrected. In the next calibrating interval the same process is repeated. However the error signal is smaller this time and the amount of voltage change on hold capacitor 95 is reduced. This process is repeated until the correct new bias value is obtained. The adjustment of the tap of potentiometer 103 adjusts the bias point which the tunnel diode bias tends to approach.

While FIG. 3 indicates precise values for systems timing, the values are by no means rigid. The considerations dictating the degree of flexibility permissible in their selection have already been generally indicated and depend greatly on the system requirements. The output waveform 105 is preferably transmitted one count later in a first rank switching sequence than the count was computed. The output waveform 105 should also contain periodic identification for synchronization purposes.

In the multiplex system illustrated, the voice signal which is balanced with respect to ground has the momentary displacements above and below zero encoded by separate logarithmic encoders, a technique having distinct advantages. The individual logarithmic encoders, however, are of very general application and may be used with many kinds of sensible analogue phenomena, either paired, as illustrated, or individually.

Although the invention has been described with respect to certain specific embodiments, it will be appreciated that various modifications and changes may be made by those skilled in the art without departing from the spirit and scope of the invention.

I claim:

1. A logarithmic encoder for converting an analogue electrical input quantity into logarithmic form comprising:

a. a semiconductor diode having an active characteristic, responding to a current exceeding a peak value by switching to a second state and thus producing a pulse:

b. means to bias said diode slightly under said peak current;

c. means for applying an analogue electrical input quantity to said diode poled to increase diode current;

d. means for applying simultaneously with said input quantity an exponentially decaying electrical quantity of opposite polarity whose magnitude initially is in excess of and later is less than said input quantity, thereby causing said diode to switch a substantial equivalence;

e. means coupled to said diode to measure the time in said exponential decay period required to attain equivalence to obtain a logarithmic output quantity comprising a source of high frequency waves whose period is small in relation to said exponential decay period; and means for counting said waves between the start of said decay period and the moment that said diode switches; and f. stabilizing means comprising means for periodically applying an input quantity of reference potential to said diode; means to derive an accurately timed reference pulse at a time corresponding approximately to the moment that said reference potential should cause said diode to switch; and means responsive to the time difference between said two pulses to adjust the bias point of said diode to correct encoder error.

2. The arrangement set forth in claim 1 wherein:

a. said reference potential is at approximately zero potential; and b. wherein said reference pulse derivation means includes a calibrating delay line, timed to produce a reference pulse at a time slightly offset from the moment that said reference potential should cause said diode to switch.

3. The arrangement set forth in claim 1 wherein said time difference responsive means comprises:

a. a first capacitor;

b. means for charging said capacitor;

c. a gate connected between said charging means and said first capacitor, said gate being rendered conductive in response to one of said pulses and nonconductive in response to the other whereby said capacitor is charged to an amount increasing with the time between said pulses; and d. means responsive to the amount of said charge for correspondingly adjusting said bias point.

4. An encoder for converting an analogue electrical input signal having momentarily positive and momentarily negative excursions comprising:

a. a first encoding element to which an exponentially decaying electrical quantity is periodically applied having a polarity opposite to said signal current and a magnitude initially in excess of and later less than the signal quantity and responsive to momentarily negative signals to produce in accordance with a logarithmic law, a digital signal indicative of the magnitude of the signal;

b. a second encoding element to which an exponentially decaying electrical quantity is periodically applied having a polarity opposite to said signal current and a magnitude initially in excess of and later less than the signal quantity and responsive to momentarily positive signals to produce in accordance with a logarithmic law, a digital signal indicative of the magnitude of the signal; said first and second encoding elements each comprising a semiconductor diode having a fast-acting active characteristic responding to a current exceeding a peak value by switching to a second state and thereby producing a pulse, the diode in each encoding element being appropriately poled for applied signal polarity; said first and second encoding elements each further comprising a source of high frequency waves whose period is small in relation to the exponential decay period, and means for counting said waves between the start of said decay period and the moment that said semiconductor diodes switch;

c. a switching matrix having a plurality of input terminals for input signals and a common output terminal coupled to both said encoding elements, said matrix being adapted to sequentially connect each input terminal to said output terminal; sequencing means for timing the operation of said encoding elements in synchronism with the operation of said switching matrix so as to produce a digital signal for each corresponding setting of said switching matrix and thereby produce in time division multiplex a succession of groups of output pulses, each group corresponding to one of the plurality of input signals;

d. stabilizing means comprising means for applying an input quantity of reference potential to one input terminal of said switching matrix; mans to derive an accurately timed reference pulse at a time corresponding approximately to the moment that said reference potential should cause said diode to switch and produce a second pulse; means responsive to the time difference between said pulses to readjust the bias of said diode to correct encoder error; and e. a multiplexing network for combining the outputs of said two encoding elements to create a composite signal having one bit assigned to polarity information and the others to magnitude information.